United States Patent
Choi et al.

(10) Patent No.: US 11,901,552 B2
(45) Date of Patent: Feb. 13, 2024

(54) POSITIVE ACTIVE MATERIAL FOR LITHIUM SECONDARY BATTERY AND LITHIUM SECONDARY BATTERY COMPRISING SAME

(71) Applicants: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

(72) Inventors: Kwon Young Choi, Seoul (KR); Jong Il Park, Pohang-si (KR); Sang Cheol Nam, Seoul (KR); Sang Hyuk Lee, Incheon (KR)

(73) Assignees: POSCO HOLDINGS INC., Seoul (KR); RESEARCH INSTITUTE OF INDUSTRIAL SCIENCE & TECHNOLOGY, Pohang-si (KR); POSCO FUTURE M CO., LTD., Pohang-si (KR)

( * ) Notice: Subject to any disclaimer, the term of this patent is extended or adjusted under 35 U.S.C. 154(b) by 315 days.

(21) Appl. No.: 16/770,248

(22) PCT Filed: Dec. 7, 2018

(86) PCT No.: PCT/KR2018/015537
§ 371 (c)(1),
(2) Date: Jun. 5, 2020

(87) PCT Pub. No.: WO2019/112375
PCT Pub. Date: Jun. 13, 2019

(65) Prior Publication Data
US 2020/0388842 A1 Dec. 10, 2020

(30) Foreign Application Priority Data
Dec. 8, 2017 (KR) ................. 10-2017-0168545

(51) Int. Cl.
| | |
|---|---|
| *H01M 4/131* | (2010.01) |
| *H01M 4/525* | (2010.01) |
| *H01M 4/36* | (2006.01) |
| *H01M 4/505* | (2010.01) |
| *H01M 10/0525* | (2010.01) |
| *H01M 4/02* | (2006.01) |

(52) U.S. Cl.
CPC .......... *H01M 4/525* (2013.01); *H01M 4/131* (2013.01); *H01M 4/366* (2013.01); *H01M 4/505* (2013.01); *H01M 10/0525* (2013.01); *H01M 2004/021* (2013.01); *H01M 2004/028* (2013.01)

(58) Field of Classification Search
CPC ...... H01M 4/525; H01M 4/131; H01M 4/505; H01M 4/625; H01M 10/0525; H01M 2004/021; H01M 4/364; H01M 4/366; H01M 4/50; H01M 4/52; H01M 4/583; H01M 10/052; H01M 4/485; H01M 4/587; H01M 2004/027; H01M 2004/028; Y02E 60/10
See application file for complete search history.

(56) References Cited

U.S. PATENT DOCUMENTS

| | | | |
|---|---|---|---|
| 2009/0068561 A1* | 3/2009 | Sun ................. | H01M 4/525 252/519.15 |
| 2016/0043389 A1 | 2/2016 | Deguchi et al. | |
| 2016/0064738 A1 | 3/2016 | Higuchi et al. | |
| 2016/0190573 A1* | 6/2016 | Sun ................. | H01M 4/485 429/223 |
| 2019/0157681 A1* | 5/2019 | Ho .................. | H01M 4/663 |

FOREIGN PATENT DOCUMENTS

| | | |
|---|---|---|
| CN | 107408667 A | 11/2017 |
| JP | 2010-108899 A | 5/2010 |
| JP | 2011-159619 A | 8/2011 |
| JP | 2012-230898 A | 11/2012 |
| KR | 10-2002-0087627 A | 5/2001 |
| KR | 10-0739620 B1 | 7/2007 |
| KR | 10-2007-0097923 A | 10/2007 |

(Continued)

OTHER PUBLICATIONS

International Search Report dated Mar. 15, 2019 issued in International Patent Application No. PCT/KR2018/015537 (with English translation).

(Continued)

*Primary Examiner* — Cynthia K Walls
(74) *Attorney, Agent, or Firm* — Morgan, Lewis & Bockius LLP

(57) ABSTRACT

The present disclosure relates to a positive active material for a lithium rechargeable battery and a lithium rechargeable battery including the same, which include a first compound represented by Chemical Formula 1 and a second compound represented by Chemical Formula 2, and a content of the first compound is 65 wt % or more based of the positive active material of 100 wt %.

$Li_{a1}Ni_{b1}Co_{c1}Mn_{d1}M1_{e1}M2_{f1}O_{2-f1}$ [Chemical Formula 1]

$Li_{a2}Ni_{b2}CO_{c2}Mn_{d2}M3_{e2}M4_{f2}O_{2-f2}$ [Chemical Formula 2]

Chemical Composition 1 and 2 of each composition and molar ratio is as defined in the specification. Each composition and molar ratio of Chemical Formula 1 and 2 is as defined in the specification.

16 Claims, No Drawings

(56) References Cited

FOREIGN PATENT DOCUMENTS

| KR | 10-0822012 B1 | 4/2008 |
| KR | 10-2013-0138073 A | 12/2013 |
| KR | 10-2014-0085347 A | 7/2014 |
| KR | 10-2014-0130067 A | 11/2014 |
| KR | 10-2015-0016125 A | 2/2015 |
| KR | 10-1614991 B1 | 4/2016 |
| KR | 10-2016-0146145 A | 12/2016 |
| KR | 10-2017-0046066 A | 4/2017 |
| KR | 10-2017-0063419 A | 6/2017 |
| WO | 2014/049976 A1 | 4/2014 |

OTHER PUBLICATIONS

Japanese Office Action dated Aug. 10, 2021 issued in Japanese Patent Application No. 2020-531515.
Extended European Search Report dated Jan. 15, 2021 issued in European Patent Application No. 18885465.7.

* cited by examiner

POSITIVE ACTIVE MATERIAL FOR LITHIUM SECONDARY BATTERY AND LITHIUM SECONDARY BATTERY COMPRISING SAME

CROSS-REFERENCE OF RELATED APPLICATIONS

This application is the U.S. National Phase under 35 U.S.C. § 371 of International Patent Application No. PCT/KR2018/015537, filed on Dec. 7, 2018, which in turn claims the benefit of Korean Application No. 10-2017-0168545, filed on Dec. 8, 2017, the entire disclosures of which applications are incorporated by reference herein.

BACKGROUND OF THE INVENTION

(a) Field of the Invention

An exemplary embodiment of the present invention relates to a positive active material for a lithium rechargeable battery, which has an excellent output characteristic, cycle-life characteristic, and resistance characteristic at a high temperature, and a lithium rechargeable battery including the same.

(b) Description of the Related Art

A positive active material, which is one of constituent elements of a lithium rechargeable battery, not only directly contributes to performance of battery energy, but also serves as a factor in determining a cycle-life characteristic. In this regard, studies on nickel-based lithium metal oxides having a layered structure such as so-called NCM have been actively performed, and an increase in a content of nickel (Ni) may lead to higher capacity. However, the nickel-based lithium metal oxide becomes structurally unstable as a content of nickel (Ni) increases, and there is a problem in that resistance increases significantly when a charge and discharge cycle is performed in a high temperature environment. Therefore, it is urgent to develop a positive active material having an excellent resistance characteristic in a high temperature environment and excellent structural stability while having a high nickel content.

SUMMARY OF THE INVENTION

Exemplary embodiments are to provide a positive active material for a lithium rechargeable battery and a lithium rechargeable battery including the same, which is capable of simultaneously realizing high capacity and structure stabilization while having excellent resistance characteristics even in a high temperature environment.

A positive active material for a lithium rechargeable battery according to an exemplary embodiment includes: a nickel-based lithium metal oxide particle doped with Zr and Al; and a coating layer disposed on the surface of the nickel-based lithium metal oxide particle, wherein the nickel-based lithium metal oxide particle includes a core portion, and a shell portion surrounding the core portion and forming a concentration gradient in which a concentration of nickel gradually decreases from an interface with the core portion toward an outer direction, and the coating layer includes an oxyhydroxide of a rare earth element.

The rare earth element may be at least one of cerium (Ce), cobalt (Co), tungsten (W), lanthanum (La), hafnium (Hf), and selenium (Se).

A primary particle of the nickel-based lithium metal oxide particle may have a rod shape with an aspect ratio of 1 or more.

The nickel-based metal oxide particle including the core portion and the shell portion may have an average composition represented by Chemical Formula 4 below.

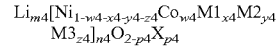
$\text{Li}_{m4}[\text{Ni}_{1-w4-x4-y4-z4}\text{Co}_{w4}\text{M1}_{x4}\text{M2}_{y4}\text{M3}_{z4}]_{n4}\text{O}_{2-p4}\text{X}_{p4}$ [Chemical Formula 4]

In Chemical Formula 4, M1 is one element selected from a group including Mn, Mg, Sn, Ca, Ge, and Ga, M2 is Zr, M3 is Al, X is one element selected from a group including F, N, and P, w4, x4, y4, z4, and p4 are respectively $0<w4\leq0.2$, $0<x4\leq0.2$, $0<y4\leq0.006$, $0<z4\leq0.006$, $0<w4+x4+y4+z4\leq0.4$, and $0\leq p4\leq0.1$, $0.95\leq m4\leq1.1$, and $0.95\leq n4\leq1.1$.

A doping amount of Zr in the nickel-based lithium metal oxide particle may be 2000 ppm to 5000 ppm.

A doping amount of A in the nickel-based lithium metal oxide particle may be 100 ppm to 1500 ppm.

A molar ratio of Zr:Al in the nickel-based lithium metal oxide particles may be 15:1 to 0.4:1.

The composition of the core portion of the nickel-based lithium metal oxide particle may be represented by Chemical Formula 5 in the entire region.

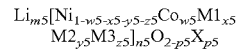
$\text{Li}_{m5}[\text{Ni}_{1-w5-x5-y5-z5}\text{Co}_{w5}\text{M1}_{x5}\text{M2}_{y5}\text{M3}_{z5}]_{n5}\text{O}_{2-p5}\text{X}_{p5}$ [Chemical Formula 5]

In Chemical Formula 5 above, M1 is one element selected from a group including Mn, Mg, Sn, Ca, Ge, and Ga, M2 is Zr, M3 is Al, X is one element selected from a group including F, N, and P, w5, x5, y5, z5, and p5 are respectively $0\leq w5\leq0.1$, $0\leq x5\leq0.1$, $0<y5\leq0.005$, $0<z5\leq0.006$, $0\leq w5+x5+y5+z5\leq0.2$, and $0\leq p5\leq0.1$, $0.95\leq m5\leq1.1$, and $0.95\leq n5\leq1.1$.

The composition of the shell portion of the nickel-based lithium metal oxide particle may be represented by Chemical Formula 5 in the interface with the core portion, may be represented by Chemical Formula 6 at the outermost part of the shell portion, and each molar content of the nickel (Ni), M1, M2, and M3 may be gradually changed from the interface to the outermost part.

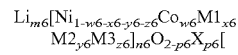
$\text{Li}_{m6}[\text{Ni}_{1-w6-x6-y6-z6}\text{Co}_{w6}\text{M1}_{x6}\text{M2}_{y6}\text{M3}_{z6}]_{n6}\text{O}_{2-p6}\text{X}_{p6}$ [Chemical Formula 6]

In Chemical Formula 6, M1 is one element selected from a group including Mn, Mg, Sn, Ca, Ge, and Ga, M2 is Zr, M3 is Al, X is one element selected from a group including F, N, and P, w6, x6, y6, z6, and p6 are respectively $0<w6\leq0.3$, $0<x6\leq0.3$, $0<y6\leq0.007$, $0<z6\leq0.006$, $0<w6+x6+y6+z6\leq0.5$, and $0\leq p6\leq0.1$, $0.95\leq m6\leq1.1$, and $0.95\leq n6\leq1.1$.

The nickel-based lithium metal oxide particle may include a first compound having an average particle diameter of 10 μm to 30 μm, and a second compound having an average particle diameter of 1 μm to 6 μm.

The mixture weight ratio of the first compound and second compound may be 60:40 to 90:10.

The nickel-based lithium metal oxide particle may have 50% or more of a value of Equation 3 below.

$R2/(R2+D2)*100\%$ [Equation 3]

In Equation 3, R2 is a radius of the core portion in the nickel-based metal oxide particle, and D2 is a thickness of the shell portion in the nickel-based metal oxide particle.

The nickel-based lithium metal oxide particle may have 75% or more of a value of Equation 3 above.

A lithium rechargeable battery according to an exemplary embodiment may include a negative electrode; a positive electrode including the positive active material for the lithium rechargeable battery according to an exemplary embodiment of the present disclosure; and an electrolyte.

The positive active material for the lithium rechargeable battery according to exemplary embodiments may have an excellent resistance characteristic in a high temperature environment, and may minimize a resistance increasing rate after performing a charge and discharge cycle.

In addition, the positive active material according to exemplary embodiments may simultaneously realize high capacity and structural stability by appropriately controlling the concentration gradient in the shell portion of the nickel-based lithium metal oxide particles.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In addition, unless explicitly described to the contrary, the word "comprise" and variations such as "comprises" or "comprising" will be understood to imply the inclusion of stated elements but not the exclusion of any other elements.

In an exemplary embodiment of the present invention, a positive active material for a lithium rechargeable battery including a nickel-based lithium metal oxide particle including a core portion and a shell portion, and a coating layer disposed on a surface of the nickel-based lithium metal oxide particle, is provided, wherein the coating layer includes an oxyhydroxide of a rare earth element.

Specifically, the nickel-based lithium metal oxide particle includes the core portion and the shell surrounding the core portion and forming a concentration gradient in which the concentration of nickel gradually decreases toward an outer direction from the interface with the core portion.

Also, the coating layer surrounding the outer surface of the shell portion is disposed on the surface of the nickel-based lithium metal oxide particle, and the coating layer may include an oxyhydroxide of the rare earth element.

In detail, the rare earth element, for example, may be at least one among cerium (Ce), cobalt (Co), tungsten (W), lanthanum (La), hafnium (Hf), and selenium (Se).

As above-described, by the oxyhydroxide of the rare earth element included in the coating layer, a decomposition reaction due to an electrolyte solution in a positive electrode interface may be suppressed. In detail, it is possible to suppress a side reaction between a Lewis acid present in the electrolyte solution and elements disposed at the interface of the positive electrode. Accordingly, even in a high temperature environment, the positive active material with the significantly improved resistance characteristic may be realized.

On the other hand, as described above, the nickel-based metal oxide has a drawback that it becomes structurally unstable while allowing high-capacity as the nickel content increases.

However, the positive active material provided in an exemplary embodiment of the present invention includes a core-shell concentration gradient (hereinafter referred to as "CSG").

The CSG means that the average concentration of nickel is maintained with a high concentration of a predetermined level or more in the core portion and the concentration of nickel drops sharply at the interface between the core portion and the shell portion, and then the concentration of nickel decreases gradually toward the outermost direction of the shell portion from the interface.

That is, since the positive active material contains a nickel-based lithium metal oxide particle composed of the CSG, it has excellent structural stability despite a high nickel content.

Therefore, while making high-capacity by maintaining the high molar content of nickel in the core portion, the structure of the positive active material may be stabilized by increasing the molar content of dissimilar metals (e.g., Mn, Co, Al, etc.) while reducing the molar content of nickel in the shell portion.

Furthermore, in the nickel-based lithium metal oxide particle having the CSG, as the metal concentration is changed in the shell portion, a primary particle thereof may have a rod shape in which an aspect ratio (a ratio of a short axis to a long axis) is larger than 1.

In the case of having such a primary particle form, there is an advantage that an a-plane of the crystal structure is directed to the surface portion, and the lithium (Li) ion moves easily between the electrolyte and the positive active material Also, since ion conductivity and electrical conductivity are high, in the case of applying the positive active material in the present exemplary embodiment, there is a merit that it is advantageous for improving initial efficiency and cycle-life characteristics of the battery.

On the other hand, the nickel-based lithium metal oxide has a problem that the crystalline size changes according to the temperature at which the precursor is sintered, thereby the primary particle characteristics (shape, size, etc.) may be changed However, the positive active material provided in one embodiment of the present invention includes the nickel-based lithium metal oxide particles having the CSG and simultaneously doped with Zr and Al, and then the crystalline size and the primary particle characteristics can be controlled appropriately. As a result, it is possible to realize the improvement of the output characteristics and lifetime characteristics of the battery to which the positive active material of the present exemplary embodiment is applied, and the minimization of the increase rate of a DCR resistance during a high-temperature charge/discharge cycle.

Specifically, the molar ratio of Zr:Al in the nickel-based lithium metal oxide particle may be 15:1 to 0.4:1, for example, 10:1 to 2:1. As the doping amount of Al doped with Zr in the above range is increased, particles having a reduced crystalline size are obtained at the same sintering temperature, whereby the primary particle size of the active material is decreased and its shape is more clearly controlled.

More specifically, the doping amount of Zr in the nickel-based lithium metal oxide particle may be 2000 to 5000 ppm, and may be 2000 to 4000 ppm, specifically, 2200 to 3800 ppm. When the doping amount of Zr in the nickel-based lithium metal oxide particles is less than 2000 ppm, the cycle performance is deteriorated, and when it exceeds 5000 ppm, the discharge capacity is deteriorated. Therefore, when the doping amount of Zr satisfies the range, when applying the positive active material according to the present exemplary embodiment, the rechargeable battery of which the discharge capacity is not deteriorated and the cycle performance is excellent may be realized.

In addition, the doping amount of Al doped therewith may be 100 to 1500 ppm, 100 to 500 ppm, and specifically 120 to 320 ppm. When the doping amount of Al in the nickel-based lithium metal oxide particles is less than 100 ppm, the cycle performance is deteriorated, and when it exceeds 1500 ppm, the discharge capacity is deteriorated. Therefore, when the doping amount of Al satisfies the range, the rechargeable battery of which the discharge capacity is not deteriorated and the cycle performance is excellent may be realized when applying the positive active material according to the present exemplary embodiment.

In addition, the nickel-based lithium metal oxide particles may have a uniform internal composition (i.e., CSG and doping amount) by particle size. That is, it is advantageous to mix the two kinds of nickel-based lithium metal oxide particles having different particle sizes at a certain ratio to increase the energy density of the positive electrode.

This is because, by a so-called bi-modal technique, the gap between large-sized particles (hereinafter referred to as "large-particles") is filled by small-sized particles (hereinafter referred to as "small-particles"), so that a large amount of positive active material can be accumulated within a unit volume.

That is, according to the present exemplary embodiment, there may be multiple nickel-based lithium metal oxide particles and they may be a mixture of two types of the nickel-based lithium metal oxide particles having different particle diameters.

This is a mixture of the nickel-based lithium metal oxide particles having the same CSG form and doping characteristics but having different particle diameters. Therefore, as the pores between the large-diameter particles may be filled with the small-particle size particles, a large amount of the positive active material can be accumulated within the unit volume. Therefore, it is advantageous to increase the energy density of the positive electrode.

Specifically, the mixture may include a first compound and a second compound having different average particle diameters (D50 particle diameters).

For example, the first compound may be the large-particle diameter nickel-based lithium metal oxide particle of which an average particle diameter (the D50 particle diameter) is 10 μm to 30 μm, in detail, 12 μm to 20 μm. When the average particle diameter of the large-particle diameter nickel-based lithium metal oxide particle satisfies the range, when manufacturing the positive active material in a bi-modal form by mixing it with the small particles, since a pellet density increases, when applying the positive active material according to the present exemplary embodiment, the capacity of the rechargeable battery may be improved.

Also, for example, the second compound may be the small-particle diameter nickel-based lithium metal oxide particles of which the average particle diameter (the D50 particle diameter) is 1 μm to 6 μm, in detail, 4 μm to 6 μm.

When the average particle diameter of the small-particle diameter nickel-based lithium metal oxide particle satisfies the range, when manufacturing the positive active material in a bi-modal form by mixing it with the large particles, since a pellet density increases, when applying the positive active material according to the present exemplary embodiment, the capacity of the rechargeable battery may be improved.

In the present specification, the D50 particle diameter means the particle size when the particles are accumulated up to a 50% by volume ratio of the active material particles of the various particle sizes distributed.

In this case, the mixture weight ratio of the large-particle diameter nickel-based lithium metal oxide particles and the small-particle diameter nickel-based lithium metal oxide particles may be 60:40 to 90:10.

In addition, as described above, in the nickel-based lithium metal oxide particles according to the present exemplary embodiment, the primary particle form may be a rod form.

Therefore, the first compound may have an a-axis crystal constant (a lattice parameter) of 2.85 Å to 2.88 Å, more specifically, 2.86 Å to 2.88 Å. In addition, a c-axis crystal constant (a lattice parameter) may be 14.13 Å to 14.37 Å, more specifically, 14.17 Å to 14.34 Å. In addition, the crystalline size may be 60 nm to 200 nm, more specifically, 80 nm to 120 nm.

However, even when Zr is doped alone on the large-particle diameter nickel-based lithium metal oxide particle, it may have the a-axis and c-axis crystal constants (the lattice parameters) of the above-described ranges. That is, for the large-particle diameter nickel-based lithium metal oxide particle, when simultaneously doping Zr and Al, compared with the case of doping Zr alone, there is no significant change in the a-axis and c-axis crystal constants (the lattice parameters).

However, when simultaneously doping Zr and Al in the large-particle diameter nickel-based lithium metal oxide particle, compared with the case of doping Zr alone, there is a big change in the crystalline size. Specifically, the crystalline size when Zr and Al are simultaneously doped on the large-particle diameter nickel-based lithium metal oxide particle may be 60 nm to 200 nm, specifically 80 nm to 120 nm, or 80 nm to 100 nm. In addition, the crystalline size when doped with Zr alone may exceed 100 nm.

Meanwhile, the nickel-based lithium metal oxide particles may have the uniform internal composition (i.e., the CSG and the doping amount) for each particle size. Accordingly, it is advantageous to implement the bi-modal active material described above.

The nickel-based lithium metal oxide particles may have a value of Equation 3 below of 50% or more and 90% or less, specifically 75% or more and 85% or less, by the particle size. When the nickel-based lithium metal oxide particle satisfies 50% or more of Equation 3 below, it is possible to improve the electrochemical characteristic and thermal safety of the rechargeable battery to which the positive active material according to the present exemplary embodiment is applied.

$$R2/(R2+D2)*100\%$$ [Equation 3]

In Equation 3, R2 is the radius of the core portion in the nickel-based metal oxide particle, and D2 is the thickness of the shell portion in the nickel-based metal oxide particle.

The average composition of the nickel-based lithium metal oxide particle, that is, the average composition of the nickel-based lithium metal oxide including the first compound and the second compound, may be represented by Formula 4.

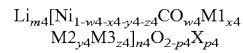
[Chemical Formula 4]

In Formula 4 above, M1 is one element selected from a group including Mn, Mg, Sn, Ca, Ge, and Ga, M2 is Zr, M3 is Al, X is one element selected from a group including F, N, and P, w4, x4, y4, z4, and p4 are respectively $0<w4\leq0.2$, $0<x4\leq0.2$, $0<y4\leq0.006$, $0<z4\leq0.006$, $0<w4+x4+y4+z4\leq0.4$, and $0\leq p4\leq0.1$, $0.95\leq m4\leq1.1$, and $0.95\leq n4\leq1.1$.

In detail, it may be that $0.002<y4\leq0.005$, $0.0004\leq z4\leq0.0015$, and p4 0.

Also, the composition of the core portion of the nickel-based lithium metal oxide particle, that is, the composition of the core portion in the nickel-based lithium metal oxide including the first compound and the second compound, may be represented by Formula 5 below.

$$Li_{m5}[Ni_{1-w5-x5-y5-z5}Co_{w5}M1_{x5}M2_{y5}M3_{z5}]_{n5}O_{2-p5}X_{p5}$$ [Chemical Formula 5]

In Formula 5 above, M1 is one element selected from a group including Mn, Mg, Sn, Ca, Ge, and Ga, M2 is Zr, M3 is Al, X is one element selected from a group including F, N, and P, w5, x5, y5, z5, and p5 are respectively $0<w5\leq0.1$, $0\leq x5\leq 0.1$, $0<y5\leq 0.006$, $0<z5\leq 0.006$, $0<w5+x5+y5+z5\leq 0.2$, and $0\leq p5\leq 0.1$, $0.95\leq m5\leq 1.1$, and $0.95\leq n5\leq 1.1$.

In detail, it may be that $0.002<y5\leq 0.004$, $0<z5\leq 0.0015$, and p5 0.

The composition of the shell portion of the nickel-based lithium metal oxide particle, that is, the composition of the shell portion in the nickel-based lithium metal oxide including the first compound and the second compound, is represented by Formula 5 above on the interface, is represented by Formula 6 below on the outermost part, and each molar content of nickel (Ni), M1, M2, and M3 from the interface to the outermost of the shell portion may gradually change.

$$Li_{m6}[Ni_{1-w6-x6-y6-z6}Co_{w6}M1_{x6}M2_{y6}M3_{z6}]_{n6}O_{2-p6}X_{p6}$$ [Chemical Formula 6]

In Formula 6 above, M1 is one element selected from a group including Mn, Mg, Sn, Ca, Ge, and Ga, M2 is Zr, M3 is Al, X is one element selected from a group including F, N, and P, w6, x6, y6, z6, and p6 are respectively $0<w6\leq 0.3$, $0<x6\leq 0.3$, $0<y6\leq 0.007$, $0<z6\leq 0.006$, $0<w6+x6+y6+z6\leq 0.5$, and $0\leq p6\leq 0.1$, $0.95\leq m6\leq 1.1$, and $0.95\leq n6\leq 1.1$.

In detail, it may be that $0.002<y6\leq 0.0065$, $0<z6\leq 0.002$, and p6 0.

Therefore, the nickel-based lithium metal oxide particles according to the present exemplary embodiment may have the stable structure according to the composition of the shell portion of Formula 6 while exerting the high-capacity according to the entire composition of Formula 4 above and the composition of the core portion of Formula 5 above.

The positive active material described above may be usefully used for the positive electrode of the lithium rechargeable battery. That is, the lithium rechargeable battery according to an exemplary embodiment includes the positive electrode including the positive active material described above and the electrolyte with a negative electrode.

The lithium rechargeable battery according to an exemplary embodiment may include an electrode assembly including the positive electrode, the negative electrode, and a separator disposed between the positive electrode and the negative electrode. The electrode assembly is wound or folded by being accommodated in the case, thereby configuring the lithium rechargeable battery.

At this time, the case may have a shape such as cylindrical, prismatic, or a thin membrane type, and may be appropriately modified according to a type of a device to be applied.

The negative electrode may be produced by mixing a negative active material, a binder, and optionally a conductive agent to prepare a composition for forming a negative electrode active material layer, and then coating it to a negative current collector such as copper.

As the negative active material, a material capable of intercalating/deintercalating lithium is used, for example, a lithium metal or a lithium alloy, coke, artificial graphite, natural graphite, an organic polymer compound combust, a carbon fiber, or the like are used.

The binder may use polyvinyl alcohol, carboxymethyl cellulose/styrene-butadiene rubber, hydroxypropyl cellulose, diacetylene cellulose, polyvinylchloride, polyvinylpyrrolidone, polytetrafluoroethylene, polyvinylidene fluoride, polyethylene, or polypropylene, but is not limited thereto. The binder may be included in an amount of 1 wt % to 30 wt % based on a total amount of the composition for forming the negative active material layer.

The conductive agent is not particularly limited as long as it does not cause a chemical change of a battery and has conductivity, and may be, for example, a graphite such as natural graphite or artificial graphite; a carbon-based material such as carbon black, acetylene black, ketjen black, channel black, furnace black, lamp black, summer black, and the like; a conductive fiber such as a carbon fiber or a metal fiber, and the like; carbon fluoride; a metal powder such as an aluminum or nickel powder; zinc oxide, a conductive whisker such as potassium titanate, and the like; a conductive metal oxide such as a titanium oxide; a conductive material such as a polyphenylene derivative; and the like. The conductive agent may be included in an amount of 0.1 wt % to 30 wt % based on a total amount of the composition for forming the negative active material layer.

The positive electrode may include the positive active material according to an exemplary embodiment.

That is, it may be produced by mixing the above-described positive active material, the binder, and optionally the conductive agent to prepare the composition for forming the positive active material layer and coating it to a positive electrode current collector such as aluminum. In addition, the conductive agent, the binder, and a solvent are used in the same manner as in the case of the positive electrode described above.

As the electrolyte filled in the lithium rechargeable battery, a non-aqueous electrolyte or a disclosed solid electrolyte may be used, and a dissolved lithium salt may be used.

The lithium salt, for example, may be one kind or more selected from a group consisting of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiCl$, and $LiI$.

The solvent of the non-aqueous electrolyte, for example, may be a cyclic carbonate such as ethylene carbonate, propylene carbonate, butylene carbonate, and vinylene carbonate; a linear carbonate such as dimethyl carbonate, methylethyl carbonate, and diethyl carbonate; esters such as methyl acetate, ethyl acetate, propyl acetate, methyl propionate, ethyl propionate, and γ-butyrolactone; ethers such as 1,2-dimethoxyethane, 1,2-diethoxyethane, tetrahydrofuran, 1,2-dioxane, and 2-methyltetrahydrofuran; nitriles such as acetonitrile; and amides such as dimethylformamide, but is not limited thereto. These may be used alone or in combination of two or more. Particularly, a mixed solvent of a cyclic carbonate and a linear carbonate may be preferably used.

In addition, as the electrolyte, a gel-phase polymer electrolyte in which an electrolyte solution is impregnated in a polymer electrolyte such as polyethylene oxide or polyacrylonitrile, or an inorganic solid electrolyte such as LiI or $Li_3N$, is possible.

As the separator, an olefin-based polymer such as polypropylene having chemical resistance and hydrophobicity; or sheets made of glass fiber, polyethylene, or a non-woven fabric may be used. When the solid electrolyte solution such as a polymer is used as the electrolyte solution, the solid electrolyte solution may also serve as the separator.

Hereinafter, the present invention is described in more detail through experimental examples. The experimental examples are only for illustrating the present invention, and the present invention is not limited thereto.

Preparation Example 1 (a Large-Particle Diameter Positive Active Material Precursor)

1) Preparation of Metal Salt Solution

First, two metal aqueous solutions having different Ni, Co, and Mn concentrations were prepared by using $NiSO_4 \cdot 6H_2O$ as a raw material of nickel, $CoSO_4 \cdot 7H_2O$ as a raw material of cobalt, and $MnSO_4 \cdot H_2O$ as a raw material of manganese.

The first metal salt aqueous solution for forming the core portion is prepared by mixing the respective raw materials so as to satisfy the stoichiometric molar ratio of $(Ni_{0.98}Co_{0.01}Mn_{0.01})(OH)_2$ in distilled water, wherein the molar concentration of the whole metal salt is 2.5 M.

Independently, the second metal salt aqueous solution for forming the shell portion is prepared by mixing the respective raw materials so as to satisfy the stoichiometric molar ratio of $(Ni_{0.64}Co_{0.23}Mn_{0.13})(OH)_2$ in distilled water, wherein the molar concentration of the whole metal salt is 2.5 M.

2) Co-Precipitation Process

A co-precipitation reactor in which two metal salt aqueous solution supply tanks are connected in series is prepared, and the first metal salt aqueous solution and the second metal salt aqueous solution are charged into respective metal salt aqueous solution supply tanks.

3 L of distilled water was placed in the co-precipitation reactor (capacity 20 L, output of the rotary motor 200 W), nitrogen gas was supplied at a rate of 2 L/min to remove dissolved oxygen, and the reactor was stirred at 140 rpm while maintaining the temperature at 50° C.

In addition, $NH_4(OH)$ at a concentration of 14 M was fed at 0.06 L/h as a chelating agent, and an 8 M NaOH solution as a pH regulator was continuously fed into the reactor at a rate of 0.1 L/h. At this time, the amount thereof was appropriately controlled so as to be maintained at pH 12.

In the reactor in which the pH was kept constant and the chelating agent was supplied, the charging time and the amount of each metal salt solution were controlled from the two metal salt aqueous solution supply tanks connected in series.

Specifically, the impregnation rate of the reactor was adjusted to 140 rpm while introducing the first metal salt aqueous solution at 0.4 L/h, and the co-precipitation reaction was performed until the diameter of the precipitate became about 11.1 μm. In this case, an average residence time of the solution in the reactor was adjusted to about 10 hours by adjusting a flow rate, and a co-precipitation compound having a slightly higher density was obtained by giving a steady state duration to the reactant after the reaction reached the steady state.

Subsequently, the total feed solution was fed at 0.4 L/h while changing the mixing ratio of the first metal salt aqueous solution and the second metal salt aqueous solution, the feed rate of the first metal salt aqueous solution was gradually decreased to 0.05 L/h, and the feed rate of the second metal salt aqueous solution was gradually increased to 0.35 L/h. At this time, the average residence time of the solution in the reactor was adjusted to 20 h or less by controlling the flow rate, and finally the co-precipitation reaction was performed until the diameter of the precipitate became 14.8 μm.

3) Post-Treatment Process

The precipitate obtained by the series of co-precipitation steps was filtered, washed with water, and then dried in an oven at 100° C. for 24 h to obtain a plurality of large-particle diameter particles of which a composition in the whole particles was $(Ni_{0.88}Co_{0.095}Mn_{0.025})(OH)_2$ and the average particle diameter was 15 μm as an active material precursor of Preparation Example 1.

Preparation Example 2 (a Small-Particle Diameter Positive Active Material Precursor)

1) Preparation of Metal Salt Solution

A first aqueous metal salt solution and a second aqueous metal salt solution as in Preparation Example 1 were prepared.

2) Co-Precipitation Process

Using the same reactor as in Preparation Example 1, the other conditions were the same and the charging time and charging amount of each metal salt solution were varied.

Specifically, the impregnation rate of the reactor was adjusted to 140 rpm while introducing the first metal salt aqueous solution at a rate of 0.4 L/h, and a co-precipitation reaction was performed until the diameter of the precipitate became approximately 3.8 to 4.5 μm. At this time, the flow rate was adjusted so that the average residence time of the solution in the reactor was about 10 hours. After the reaction reached a steady state, the steady state duration was given to the reactant to obtain a denser co-precipitated compound.

Subsequently, the total feed solution was fed at 0.4 L/h while changing the mixing ratio of the first metal salt aqueous solution and the second metal salt aqueous solution, the feed rate of the first metal salt aqueous solution was gradually decreased to 0.05 L/h, and the feed rate of the second metal salt aqueous solution was gradually increased to 0.35 L/h. At this time, the average residence time of the solution in the reactor was controlled to be within 15 h by adjusting the flow rate, and the co-precipitation reaction was performed until the diameter of the precipitate finally reached 5.3 μm.

3) Post-Treatment Process

The precipitate obtained according to the series of co-precipitation steps was filtered, washed with water, and then dried in an oven at 100° C. for 24 h to obtain a plurality of small-particle diameter particles of which a composition in the whole particles is $(Ni_{0.88}Co_{0.095}Mn_{0.025})(OH)_2$ and an average particle diameter is 5 μm was obtained as an active material precursor of Production Example 2.

Example 1 (a Bi-Modal Positive Active Material in which a $CeO_xOH_y$ Coating Layer is Formed, Simultaneously Doping of Zr: 0.0037 Mol and Al: 0.0005 Mol)

Preparation of a Positive Active Material

1) Sintering Process (1) Lithium salts $LiOH \cdot H_2O$ (Samjun Chem, battery grade), doping raw materials $ZrO_2$ (Aldrich, 4N) and $Al(OH)_3$ (Aldrich, 4N) were homogeneously mixed with the positive active material precursor prepared in Preparation Example 1.

During the mixing, the molar ratio of the precursor to the lithium salt was 1:1.05, and the content of Zr in the total amount was 0.0037 mol while the content of Al was 0.0005 mol.

The mixture was charged into a tube furnace (inner diameter: 50 mm, length: 1000 mm) and heated while introducing oxygen at 200 mL/min.

The sintering temperature was maintained at 480° C. for 5 h and then maintained at 700 to 750° C. for 16 h, and the heating rate was 5° C./min. Accordingly, a large-particle diameter sintered body powder of which a composition in the whole particles is $Li_{1.05}(Ni_{0.88}Co_{0.095}Mn_{0.025})_{(0.995)}Zr_{0.0037}Al_{0.0005}O_2$ was independently obtained.

(2) A small-particle diameter sintered body powder of which a composition in the whole particles is $Li_{1.05}(Ni_{0.88}Co_{0.095}Mn_{0.025})_{(0.9958)}Zr_{0.0037}Al_{0.0005}O_2$ was obtained by the same method as (1), except for using the small-particle diameter positive active material precursor obtained in Preparation Example 2 instead of the large-particle diameter positive active material precursor.

2) Mixing and Sintering Process

The large-particle diameter sintered body and the small-particle diameter sintered body manufactured in (1) were mixed, and a weight ratio of the large-particle diameter sintered body to the small-particle diameter sintered body was 8:2.

After the sintering of the mixture, the surface residual lithium was removed by washing with water.

3) Coating Process

The material subjected to the mixing and sintering processes was dry-mixed with $Ce(OH)_4$ (Aldrich) and then heat-treated to uniformly coat $CeO_xOH_y$ ($0 \leq x \leq 1$, $0 \leq y \leq 1$, $x+y=1$) on the surface, thereby preparing the positive active material coated with the coating layer.

Preparation of Coin Cell

For the positive active material prepared as described above, the weight ratio of PVDF (polyvinylidene fluoride, KF1100) as a binder and Denka Black (commercial name: Super P) as a conductive agent was 92.5:3.5:4 (the active material to the binder to the conductive agent) was mixed and NMP (N-methyl-2-pyrrolidone) was added to adjust the viscosity of the slurry.

The slurry was coated on an Al foil (thickness: 15 μm) by using a doctor blade, and dried and rolled to manufacture the positive electrode. A loading amount of the positive electrode was 14.6 mg/cm$^2$.

As the electrolytic solution, 1.5 vol % of VC was added to 1 M $LiPF_6$ at EC:DMC:EMC=3:4:3 (vol %). A 2032 half-cell was fabricated using the positive electrode, the electrolyte solution, a PP separator, and a lithium negative electrode (200 μm, Honzo Metal) according to a conventional manufacturing method.

Example 2 (a CeOxOHy Coating Layer is Simultaneously Doped with a Bi-Modal Positive Active Material, Zr: 0.0037 Mol and Al: 0.001 Mol)

Preparation of a Positive Active Material

1) Sintering Process (1) For the large-particle diameter positive active material precursor obtained from Preparation Example 1, $LiOH \cdot H_2O$ (Samjeon Chemical, battery grade) as a lithium salt, $ZrO_2$ (Aldrich, 4N) as a doping raw material, and $Al(OH)_3$ (Aldrich, 4N) were uniformly mixed.

During the mixing, the molar ratio of the precursor to the lithium salt was 1:1.05, and the amount of Zr was 0.0037 mol while the amount of Al was 0.001 mol among the total amount.

The mixture was charged into a tube furnace (inner diameter: 50 mm, length: 1000 mm) and heated while introducing oxygen at 200 mL/min.

The sintering temperature was maintained at 480° C. for 5 h, then maintained at 700 to 750° C. for 16 h, and the heating rate was 5° C./min.

Accordingly, a large-particle diameter sintered body powder having a composition of $Li_{1.05}(Ni_{0.88}Co_{0.095}Mn_{0.025})_{0.09953}Zr_{0.0037}Al_{0.001}O_2$ in the whole particles was independently obtained.

(2) A small-particle diameter sintered body powder of which a composition of the whole particles is $Li_{1.05}(Ni_{0.88}Co_{0.095}Mn_{0.025})_{0.09953}Zr_{0.0037}Al_{0.001}O_2$ was obtained by the same method as (1), except for using the small-particle diameter positive active material precursor obtained in Preparation Example 2 instead of the large-particle diameter positive active material precursor.

2) Mixing and Sintering Process

The large-particle diameter sintered body and the small-particle diameter sintered body manufactured in (1) were mixed, and a weight ratio of the large-particle diameter sintered body to the small-particle diameter sintered body was 8:2.

After the sintering of the mixture, the surface residual lithium was removed by washing with water.

3) Coating Process

The material subjected to the mixing and sintering processes was dry-mixed with $Ce(OH)_4$ (Aldrich) and then heat-treated to uniformly coat $CeO_xOH_y$ ($0 \leq x \leq 1$, $0 \leq y \leq 1$, $x+y=1$) on the surface, thereby preparing the positive active material formed with the coating layer.

Preparation of Coin Cell

The coin cell was prepared in the same method as in Example 1.

Comparative Example 1 (a Bi-Modal Positive Active Material in a Case without Forming a Coating Layer)

Preparation of a Positive Active Material

Except for the process of forming the coating layer in 3) in Example 1, the positive active material was prepared without forming the coating layer by the same method as described in 1) and 2).

Preparation of Coin Cell

The coin cell was prepared in the same manner as in Example 1.

Comparative Example 2 (a Case of Coating Boron)

Preparation of a Positive Active Material

For the material subjected to the mixing and sintering process after passing through 1) the sintering process and 2) the mixing and sintering processes by the same method as Example 1, the surface residual lithium was removed by a washing with water. The material was dry-mixed with $H_3BO_3$ powder and then heat-treated to uniformly coat B on the surface of each sintered body particle.

Finally, with reference to the entire coating layer, the positive active material on which B was coated at 800 ppm was obtained.

Preparation of Coin Cell

A coin cell was manufactured by the same method as Example 1.

Comparative Example 3 (Bi-Modal Positive Active Material, Zr Doping Alone, Ce Coating)

Preparation of a Positive Active Material
1) Sintering process
(1) For a large-particle diameter positive active material precursor obtained from Preparation Example 1, LiOH·H$_2$O (Samjeon Chemical, battery grade) as a lithium salt and ZrO$_2$ (Aldrich, 4N) as a doping raw material were uniformly mixed.

During the mixing, the molar ratio of the precursor to the lithium salt was 1:1.05, and the amount of Zr was 0.0037 mol among the total amount.

The mixture was charged into a tube furnace (inner diameter: 50 mm, length: 1000 mm) and heated while introducing oxygen at 200 mL/min.

The sintering temperature was maintained at 480° C. for 5 h, then maintained at 700 to 750° C. for 16 h, and the heating rate was 5° C./min. Accordingly, the large-particle diameter sintered body powder particle having the composition of $Li_{1.05}(Ni_{0.88}Co_{0.095}Mn_{0.025})_{0.9963}Zr_{0.0037}O_2$ in the whole particles was independently obtained.

(2) A small-particle diameter sintered body powder of which a composition was $Li_{1.05}(Ni_{0.88}Co_{0.095}Mn_{0.025})_{0.9963}Zr_{0.0037}O_2$ was obtained by the same method as (1) except for using the small-particle diameter positive active material precursor obtained in Preparation Example 2 instead of the large-particle diameter positive active material precursor.

2) Mixing and Sintering Process
The large-particle diameter sintered body and the small-particle diameter sintered body manufactured in (1) were mixed, and a weight ratio of the large-particle diameter sintered body to the small-particle diameter sintered body was 8:2.

After the sintering of the mixture, the surface residual lithium was removed by washing with water.

3) Coating Process
The material subjected to the mixing and sintering processes was dry-mixed with Ce(OH)$_4$ (Aldrich) and then heat-treated to uniformly coat CeO$_x$OH$_y$ (0≤x≤1, 0≤y≤1, x+y=1) on the surface, thereby preparing the positive active material coated with the coating layer.

Preparation of Coin Cell
The coin cell was prepared in the same method as in Example 1.

Comparative Example 4 (a Bi-Modal Positive Active Material, Al Alone Doping, Ce Coating)

Preparation of a Positive Active Material
1) Sintering Process
(1) For the large-particle diameter positive active material precursor obtained from Preparation Example 1, LiOH·H$_2$O (Samjeon Chemical, battery grade) as a lithium salt, ZrO$_2$ (Aldrich, 4N) as a doping raw material, and Al(OH)$_3$ (Aldrich, 4N) were uniformly mixed.

During the mixing, the molar ratio of the precursor to the lithium salt was 1:1.05, and the amount of Al was 0.0005 mol among the total amount.

The mixture was charged into a tube furnace (inner diameter: 50 mm, length: 1000 mm) and heated while introducing oxygen at 200 mL/min.

The sintering temperature was maintained at 480° C. for 5 h, and then maintained at 700 to 750° C. for 16 h, while the heating rate was 5° C./min. Accordingly, the large-particle diameter sintered body powder particle having the composition of $Li_{1.05}(Ni_{0.88}Co_{0.095}Mn_{0.025})_{0.9995}Al_{0.0005}O_2$ in the whole particles was independently obtained.

(2) A small-particle diameter sintered body powder of which a composition of the whole particles was $Li_{1.05}(Ni_{0.88}Co_{0.095}Mn_{0.025})_{0.9995}Al_{0.0005}O_2$ was obtained by the same method as (1), except for using the small-particle diameter positive active material precursor obtained in Preparation Example 2 instead of the large-particle diameter positive active material precursor.

2) Mixing and Sintering Process
The large-particle diameter sintered body and the small-particle diameter sintered body manufactured in (1) were mixed, and a weight ratio of the large-particle diameter sintered body to the small-particle diameter sintered body was 8:2.

After the sintering of the mixture, the surface residual lithium was removed by washing with water.

3) Coating Process
The material subjected to the mixing and sintering processes was dry-mixed with Ce(OH)$_4$ (Aldrich) and then heat-treated to uniformly coat CeO$_x$OH$_y$ (0≤x≤1, 0≤y≤1, x+y=1) on the surface, thereby preparing the positive active material formed with the coating layer.

Preparation of Coin Cell
The coin cell was prepared in the same method as in Example 1.

Comparative Example 5 (a Positive Active Material Formed with CeO2 Coating Layer)

Preparation of a Positive Active Material
A material in which a residual lithium on the surface was enhanced was obtained by the same method as described in 1) and 2) in Example 1, and the material subjected to the mixing and sintering processes was dry-mixed with CeO$_2$ and then heat-treated to uniformly coat CeO$_2$ on the surface, thereby manufacturing the positive active material formed with the coating layer.

Preparation of Coin Cell
The coin cell was prepared in the same method as in Example 1.

Reference Example 1 (Large-Particle Diameter Positive Active Material Precursor, Al and Zr Doping, Ce Coating)

For a large-particle diameter positive active material precursor obtained in Preparation Example 1, LiOH·H$_2$O (Samjeon Chemical, battery grade) as a lithium salt, ZrO$_2$ (Aldrich, 4N) as a doping raw material, and Al(OH)$_3$ (Aldrich, 4N) were uniformly mixed.

During the mixing, the molar ratio of the precursor to the lithium salt was 1:1.05, and the amount of Zr was 0.0037 mol among the total amount.

The mixture was charged into a tube furnace (inner diameter: 50 mm, length: 1000 mm) and heated while introducing oxygen at 200 mL/min.

The sintering temperature was maintained at 480° C. for 5 h, and then maintained at 700 to 750° C. for 16 h, while the heating rate was 5° C./min. Accordingly, the large-particle diameter sintered body powder having the composition of $Li_{1.05}(Ni_{0.88}Co_{0.095}Mn_{0.025})Zr_{0.0037}Al_{0.0005}O_2$ and the average particle diameter of 15 μm in the whole particles was obtained.

The large-particle diameter sintered body in which the residual lithium of the surface was removed through the washing after the sintering was thereby manufactured.

The material on which the surface residual lithium was removed was dry-mixed with Ce(OH)$_4$ (Aldrich) and heat-treated to uniformly coat CeO$_x$OH$_y$ (0≤x≤1, 0≤y≤1, x+y=1) on the surface, thereby preparing the positive active material formed with the coating layer.

Reference Example 2 (the Small-Particle Diameter Positive Active Material Precursor, Al and Zr Doping, Ce Coating)

Except for using the small-particle diameter positive active material precursor obtained from Preparation Example 2, the small-particle diameter sintered body powder having the composition of Li$_{1.05}$(Ni$_{0.88}$Co$_{0.095}$Mn$_{0.025}$)Zr$_{0.0037}$Al$_{0.0005}$O$_2$ in the whole particles and the average particle diameter of the 5 μm was obtained by the same method as Reference Example 1.

The small-particle diameter sintered body in which the residual lithium of the surface was removed through the washing after the sintering was thereby manufactured.

The material from which the surface residual lithium was removed was dry-mixed with Ce(OH)$_4$ (Aldrich) and heat-treated to uniformly coat CeO$_x$OH$_y$ (0≤x≤1, 0≤y≤1, x+y=1) on the surface, thereby preparing the positive active material formed with the coating layer.

Experimental Example 1—Evaluation of Charge and Discharge Characteristics

Lithium rechargeable batteries manufactured according to Examples 1 and 2, Comparative Examples 1 and 2, and Reference Example 1 were evaluated.

A charge capacity and a discharge capacity were measured by being discharged with a constant current-constant voltage at 0.2 C, 4.25 V, and 0.005 C cut-off conditions and with a charge and constant current of 0.2 C and 2.5 V cut-off conditions.

Results are represented in Table 1 below.

TABLE 1

| Items | Charge capacity [mAh/g] | Discharge capacity [mAh/g] | Coulomb efficiency [%] |
|---|---|---|---|
| Example 1 | 234.2 | 213.8 | 91.3 |
| Example 2 | 233.4 | 212.6 | 91.1 |
| Comparative Example 1 | 232.2 | 209.1 | 90.1 |
| Comparative Example 2 | 237.5 | 215.2 | 90.6 |
| Reference Example 1 | 232.2 | 207.3 | 89.3 |

Referring to Table 1, in the case of the lithium rechargeable battery manufactured according to Examples 1 and 2, compared with the lithium rechargeable battery manufactured according to Comparative Examples 1 and 2 and Reference Example 1, it may be confirmed that the charge and discharge capacity is excellent, and accordingly, Coulomb efficiency is also excellent.

Therefore, it may be confirmed that the charge and discharge characteristics may be improved when the positive active material according to the present exemplary embodiment is applied to the lithium rechargeable battery.

Experimental Example 2—DC Internal Resistance (Direct Current, Internal Resistance: DC-IR)

For the lithium rechargeable battery prepared according to Examples 1 and 2, Comparative Examples 1 to 5, and Reference Example 2, the charge and discharge was performed with the same conditions as Experimental Example 2, and DC internal resistance (DC-IR) was measured based on a voltage change during an initial discharge of 60 s in each cycle.

The DC-IR value at the 1$^{st}$ cycle and the DC-IR value at the 30$^{th}$ cycle are represented, and an increase amount was calculated and is shown in Table 2 below.

TABLE 2

| Item | 1$^{st}$ DC-IR [Ω] | 30$^{th}$ DC-IR [Ω] | Increase amount [Ω] |
|---|---|---|---|
| Example 1 | 11.8 | 25.3 | 13.5 |
| Example 2 | 11.3 | 25.1 | 13.8 |
| Comparative Example 1 | 12.5 | 35.0 | 22.5 |
| Comparative Example 2 | 19.7 | 39.1 | 19.4 |
| Comparative Example 3 | 11.8 | 29.1 | 17.3 |
| Comparative Example 4 | 11.6 | 29.3 | 17.7 |
| Comparative Example 5 | 11.5 | 28.3 | 16.8 |
| Reference Example 2 | 10.0 | 45.0 | 35.0 |

Referring to Table 2, in the case of the lithium rechargeable battery prepared according to Examples 1 and 2, it may be confirmed that a resistance increase amount was not large even after performing the charge and discharge 30 times.

On the other hand, in the case of the lithium rechargeable batteries manufactured according to Comparative Examples 1 to 5 and Reference Example 2, the resistance increase amount was significantly increased after 30 cycles.

Therefore, when applying the positive active material according to the present exemplary embodiment, it can be confirmed that the lithium rechargeable battery having the excellent resistance characteristic may be implemented.

The exemplary embodiments and modified examples of the present invention have been described and shown with reference to the accompanying drawings, but the present invention is not limited to the exemplary embodiments and may be manufactured in various forms. As described above, it will be appreciated by those skilled in the art that changes may be made in these embodiments without departing from the principles and spirit of the general inventive concept, the scope of which is defined in the appended claims, and their equivalents. Therefore, it should be understood that the exemplary embodiments described above are not limitative but are exemplary in all the aspects.

What is claimed is:

1. A positive active material for a lithium rechargeable battery, comprising:
   a nickel-based lithium metal oxide particle doped with Zr and Al; and
   a coating layer disposed on the surface of the nickel-based lithium metal oxide particle,
   wherein
   the nickel-based lithium metal oxide particle includes
      a core portion, and
      a shell portion surrounding the core portion and forming a concentration gradient in which a concentration of nickel gradually decreases from an interface with the core portion toward an outer direction,
   the coating layer includes an oxyhydroxide of a rare earth element, wherein the rare earth element is cerium (Ce),
   the nickel-based lithium metal oxide particle includes:
      a first particle having an average particle diameter of 10 μm to 30 μm, and
      a second particle having an average particle diameter of 1 μm to 6 μm, a molar ratio of Zr:Al in the nickel-based lithium metal oxide particles is 10:1 to 2:1.

2. The positive active material for the lithium rechargeable battery of claim 1, wherein
a primary particle of the nickel-based lithium metal oxide particle has a rod shape with an aspect ratio of 1 or more.

3. The positive active material for the lithium rechargeable battery of claim 1, wherein
the nickel-based metal oxide particle including the core portion and the shell portion has an average composition represented by Chemical Formula 4 below:

$$Li_{m4}[Ni_{1-w4-x4-y4-z4}Co_{w4}M1_{x4}M2_{y4}M3_{z4}]_{n4}O_{2-p4}X_{p4} \qquad \text{[Chemical Formula 4]}$$

M1 is one element selected from a group including Mn, Mg, Sn, Ca, Ge, and Ga,

M2 is Zr,

M3 is Al,

X is one element selected from a group including F, N, and P, w4, x4, y4, z4, and p4 are respectively $0<w4\leq0.2$, $0<x4\leq0.2$, $0<y4\leq0.006$, $0<z4\leq0.006$, $0<w4+x4+y4+z4\leq0.4$ and $0\leq p4\leq0.1$, $0.95\leq m4\leq1.1$, and $0.95\leq n4\leq1.1$).

4. The positive active material for the lithium rechargeable battery of claim 1, wherein
a doping amount of Zr in the nickel-based lithium metal oxide particle is 2000 ppm to 5000 ppm.

5. The positive active material for the lithium rechargeable battery of claim 1, wherein
a doping amount of Al in the nickel-based lithium metal oxide particle is 100 ppm to 1500 ppm.

6. The positive active material for the lithium rechargeable battery of claim 1, wherein
a molar ratio of Zr:Al in the nickel-based lithium metal oxide particles is 15:1 to 0.4:1.

7. The positive active material for the lithium rechargeable battery of claim 1, wherein
the composition of the core portion of the nickel-based lithium metal oxide particle is represented by Chemical Formula 5 in the entire region:

$$Li_{m5}[Ni_{1-w5-x5-y5-z5}Co_{w5}M1_{x5}M2_{y5}M3_{z5}]_{n5}O_{2-p5}X_{p5} \qquad \text{[Chemical Formula 5]}$$

(in Chemical Formula 5,

M1 is one element selected from a group including Mn, Mg, Sn, Ca, Ge, and Ga,

M2 is Zr, M3 is Al,

X is one element selected from a group including F, N, and P, w5, x5, y5, z5, and p5 are respectively $0\leq w5\leq0.1$, $0\leq x5\leq0.1$, $0<y5\leq0.005$, $0<z5\leq0.006$, $0\leq w5+x5+y5+z5\leq0.2$, and $0<p5<0.1$, $0.95\leq m5\leq1.1$, and $0.95\leq n5\leq1.1$).

8. The positive active material for the lithium rechargeable battery of claim 7, wherein
the composition of the shell portion of the nickel-based lithium metal oxide particle is represented by Chemical Formula 5 in the interface with the core portion, is represented by Chemical Formula 6 at the outermost part of the shell portion, and each molar content of the nickel (Ni), M1, M2, and M3 is gradually changed from the interface to the outermost part:

$$Li_{m6}[Ni_{1-w6-x6-y6-z6}Co_{w6}M1_{x6}M2_{y6}M3_{z6}]_{n6}O_{2-p6}X_{p6}[ \qquad \text{Chemical Formula 6]}$$

(in Chemical Formula 6,

M1 is one element selected from a group including Mn, Mg, Sn, Ca, Ge, and Ga,

M2 is Zr, M3 is Al,

X is one element selected from a group including F, N, and P, w6, x6, y6, z6, and p6 are respectively $0<w6\leq0.3$, $0<x6\leq0.3$, $0<y6\leq0.007$, $0<z6\leq0.006$, $0<w6+x6+y6+z6\leq0.5$, and $0\leq p6\leq0.1$, $0.95\leq m6\leq1.1$, and $0.95\leq n6\leq1.1$).

9. The positive active material for the lithium rechargeable battery of claim 1, wherein
the first particle has an average particle diameter of 12 1μm to 20 μm and
the second particle has an average particle diameter of 41μm to 6 μm.

10. The positive active material for the lithium rechargeable battery of claim 1, wherein
a mixture weight ratio of the first particle and second particle is 60:40 to 90:10.

11. The positive active material for the lithium rechargeable battery of claim 1, wherein
the nickel-based lithium metal oxide particle has 50% or more of a value of Equation 3 below:

$$R2/(R2+D2)*100\% \qquad \text{[Equation 3]}$$

in Equation 3, R2 is a radius of the core portion in the nickel-based metal oxide particle, and D2 is a thickness of the shell portion in the nickel-based metal oxide particle.

12. The positive active material for the lithium rechargeable battery of claim 11, wherein
the nickel-based lithium metal oxide particle has 75% or more of a value of Equation 3 above.

13. A lithium rechargeable battery comprising:
a negative electrode;
a positive electrode including the positive active material for the lithium rechargeable battery of claim 1; and
an electrolyte.

14. The positive active material for the lithium rechargeable battery of claim 1, wherein
a doping amount of Zr in the nickel-based lithium metal oxide particle is 2200 ppm to 3800 ppm.

15. The positive active material for the lithium rechargeable battery of claim 1, wherein
a doping amount of Al in the nickel-based lithium metal oxide particle is 120 ppm to 320 ppm.

16. The positive active material for the lithium rechargeable battery of claim 1, wherein
a mixture weight ratio of the first particle to the second particle is 60:40 to 90:10.

* * * * *